United States Patent
Birrell

(10) Patent No.: US 8,021,595 B2
(45) Date of Patent: Sep. 20, 2011

(54) COMPOSITE MATERIAL

(75) Inventor: Michael Ian Birrell, Hertfordshire (GB)

(73) Assignee: B.I. Group, Plc (GB)

( * ) Notice: Subject to any disclaimer, the term of this patent is extended or adjusted under 35 U.S.C. 154(b) by 507 days.

(21) Appl. No.: 11/572,297

(22) PCT Filed: Jul. 20, 2005

(86) PCT No.: PCT/GB2005/002857
§ 371 (c)(1), (2), (4) Date: Jan. 30, 2008

(87) PCT Pub. No.: WO2006/008529
PCT Pub. Date: Jan. 26, 2006

(65) Prior Publication Data
US 2008/0233342 A1    Sep. 25, 2008

(30) Foreign Application Priority Data

Jul. 20, 2004 (GB) .................................. 0416197.2
Jul. 20, 2004 (GB) .................................. 0416198.0

(51) Int. Cl.
B29C 45/00 (2006.01)
B29C 47/00 (2006.01)
B29C 45/14 (2006.01)
B32B 37/00 (2006.01)

(52) U.S. Cl. .......... 264/511; 264/510; 264/513; 264/516
(58) Field of Classification Search .................. 264/510, 264/511, 513, 516
See application file for complete search history.

(56) References Cited

U.S. PATENT DOCUMENTS

| 1,444,478 A | | 2/1923 | Mueller |
| 3,179,782 A | * | 4/1965 | Matvay ...................... 219/76.16 |
| 4,734,321 A | | 3/1988 | Radvan et al. |
| 4,770,929 A | | 9/1988 | Nobumasa et al. |
| 4,851,167 A | * | 7/1989 | Marc ............................. 264/421 |
| 4,931,358 A | | 6/1990 | Wahl et al. |

(Continued)

FOREIGN PATENT DOCUMENTS

DE    3535272 C2    4/1995

(Continued)

OTHER PUBLICATIONS

International Search Report and Written Opinion, PCT/GB2005/002857, Nov. 24, 2005.

(Continued)

*Primary Examiner* — Khanh Nguyen
*Assistant Examiner* — Matthew Hoover
(74) *Attorney, Agent, or Firm* — Boyle Fredrickson, S.C.

(57) ABSTRACT

A method of producing a panel having at least one feature comprising a discontinuation in curvature of surface in the surface, the method comprising the steps of: providing a first reinforced layer of long and/or continuous parallel fiber reinforced thermoplastic of a first polymer (102a, 104a); providing a core layer of thermoplastic with at least roughly 70% by volume of a second polymer which is compatible with the first polymer (106); providing a second reinforced layer of long or continuous parallel fiber reinforced thermoplastic of the first polymer (102b, 104b); stacking the layers such that the reinforced layers are separated by the core layer; introducing the stack into a panel mould and heating the mould to at least the melting point of the predetermined polymer to consolidate the layers and form the panel.

19 Claims, 3 Drawing Sheets

U.S. PATENT DOCUMENTS

| | | | |
|---|---|---|---|
| 5,094,907 A * | 3/1992 | Yamamura et al. | 428/293.4 |
| 5,104,718 A | 4/1992 | Asada et al. | |
| 5,721,177 A | 2/1998 | Frank | |
| 5,866,051 A * | 2/1999 | Lin et al. | 264/45.9 |
| 5,879,608 A * | 3/1999 | Lammeck et al. | 264/239 |
| 6,042,765 A * | 3/2000 | Sugahara et al. | 264/46.1 |
| 2003/0021930 A1 | 1/2003 | Mientus et al. | |
| 2005/0153120 A1 | 7/2005 | Birrell | |

FOREIGN PATENT DOCUMENTS

| | | |
|---|---|---|
| DE | 19520477 A1 | 12/1996 |
| DE | 10237694 A1 | 3/2004 |
| EP | 0056703 | 7/1982 |
| EP | 0088584 | 9/1983 |
| EP | 0056703 B1 | 3/1987 |
| EP | 0259121 A3 | 3/1988 |
| EP | 0265292 A2 | 4/1988 |
| EP | 04348464 A1 | 7/1991 |
| EP | 0648602 A1 | 4/1995 |
| EP | 0695626 A2 | 2/1996 |
| EP | 0697275 A3 | 2/1996 |
| EP | 0758577 A1 | 2/1997 |
| EP | 0844064 A1 | 5/1998 |
| EP | 1145841 A1 | 10/2001 |
| GB | 1146036 | 3/1969 |
| GB | 1547280 | 6/1979 |
| JP | 55113470 A | 9/1980 |
| JP | 63060743 | 3/1988 |
| JP | 63212517 | 9/1988 |
| JP | 3127668 A | 5/1991 |
| JP | 5031811 | 2/1993 |
| JP | 800101 A | 1/1996 |
| JP | 8001081 | 1/1996 |
| WO | WO95/16567 A1 | 6/1995 |
| WO | WO99/50059 | 10/1999 |
| WO | WO 0021742 A1 | 4/2000 |
| WO | WO00/27632 | 5/2000 |
| WO | WO 0027632 * | 5/2000 |
| WO | WO0027632 * | 5/2000 |
| WO | WO02/076711 A | 10/2002 |
| WO | WO02/090089 A1 | 11/2002 |
| WO | WO02090089 * | 11/2002 |
| WO | WO 2005/070664 A1 | 8/2005 |

OTHER PUBLICATIONS

SYMALIT® GMT—Glass Mat reinforced Thermoplastics Brochure—Apr. 1984—(16 pages).

European Search Report dated Apr. 20, 2010 with Translation of B.I. Group Notice of Opposition (Reference TG 31372P EPP—Appl. No./Patent No. 05704896.9-2124/1737650)—(44 pages).

European Search Report dated Jul. 2, 2010 (Application No. 05 767 925.0-2124—Reference TG30529P.EPP)—(4 pages).

Japanese First Office Action dated Jul. 20, 2010 (6 pages).

Japanese Office Action dated Oct. 26, 2010 (Application No. JP2006-549337 A).

English Language Translation of JP63212517—(10 pages).

\* cited by examiner

COMPOSITE MATERIAL

The present invention relates to the field of composite plastics and related manufacturing methods.

Plastics provide a versatile, convenient material for many products and has, in a great range of applications, replaced materials such as metal or wood. The convenience arises from the malleability of plastics, the fact that it can take on complex shapes, and the durability compared with previously used materials. Further, there is a great range of plastics available, with different characteristics such as melting point, stiffness, density, etc, and as such a suitable plastic can be found for a vast range of applications.

It will also be appreciated that many types of plastic are recyclable (this applies more to so-called thermo-plastics, which can be re-melted, than to thermosetting plastics). This is particularly beneficial as environmental issues have become important to consumers as well as the subject of considerable legislation. There now exist in various countries incentives to use or produce recyclable products in industry.

However, it will be appreciated that existing plastics cannot always replicate the properties of other materials. Considering the example of a bonnet of a car, this is required to be strong (to protect the occupants of the car in the event of a collision), resilient (to protect a pedestrian hit in a collision), and also to have a low heat expansion factor (it will be appreciated that the bonnet will be heated by the engine and simply by standing in the sun; it is important that the part does not change shape and size significantly). There are further manufacturing preferences—the part must be paintable, and produced at reasonable cost. It is preferably fairly light-weight (lighter cars are either cheaper to run or better performers than a heavier car of the same design) and easy to mould, both in terms of taking the required shape and in taking the required design details, such as an inset area for a car company's badge.

In the past, steel, aluminium or thermosetting plastic has been used to manufacture car bonnets, roofs and other like parts. However, the tooling-up costs associated with this method make steel and aluminium undesirable and unsuitable for limited production runs. Thermosetting plastics are not generally recyclable.

Fibre reinforced sheets are well known in order to provide plastics material with improved mechanical properties. The fabrication of such materials is known from documents such as U.S. Pat. No. 5,194,462 which describes a method of making a glass matt thermoplastic material in which the reinforcing fibres are arranged in a continuous gradient layer structure wherein the density of fibres is continuously varied through the material from a high density layer to a lower density layer. This process is commonly referred to as a 'film stack' process. Other methods of producing a random fibre matrix in a thermoplastic include the 'The ICI hot tube process', 'Flexline', 'Bay Mills/Spiflex', 'Radlite' and powder impregnation.

According to a first aspect of the invention there is provided a method of producing a panel having at least one feature comprising a discontinuation in curvature of surface in the surface, the method comprising the steps of:
providing a first reinforced layer of long or continuous parallel fibre reinforced thermoplastic of a first polymer;
providing a core layer of thermoplastic of a second polymer which is compatible with the first polymer;
providing a second reinforced layer of long or continuous parallel fibre reinforced thermoplastic of the first polymer;
stacking the layers such that the reinforced layers are separated by the core layer;
introducing the stack into a panel mould and heating the mould to at least the melting point of the predetermined polymer to consolidate the layers and form the panel.

The skilled person will appreciate that the parallel fibres in a layer may run in one direction or more than one direction, for example in woven fibre reinforced material. Further, it should be appreciated that 'compatible' in the sense used above means that the plastic layers melt together. It is likely that compatible polymers have the same polymer base. It will be appreciated that with thermosetting plastics melting of the core and reinforced layers would not occur in the same manner and so thermosetting plastics materials would not be suitable for this method.

Further, a discontinuity in the curvature of the surface may comprise rounding, for example at the edges of the panel, or may comprise an indentation. In one embodiment, the panel is a car body panel and the indentation may comprise a hollow for a car company's badge or a particular design feature, such as a fin, a vent, ridge, undulation, or the like.

This may be advantageous as separating the two reinforced layers adds stiffness and strength to the panel which allow the panel to be used in place of steel panels (which are expensive) and thermosetting plastic panels (which cannot easily be recycled). The material may also exhibit qualities of resilience which improve pedestrian safety. The reinforcing fibres act to limit the thermal expansion of the panels, which can therefore be used in part with a high thermal load, such as car roofs or bonnets, which are heated by the sun. Further, the process of heating the mould can result in a smooth surface which can readily be painted. The core provides a polymer rich layer and polymer from this layer can penetrate the reinforced layers in particular in sharp concave corners of a mould to fill voids left between the reinforcing layers and these corners. The skilled person will appreciate that the resulting panel will better follow the shape of the mould. Further, heating the mould allows a low pressure to be used in the moulding process, which means that delicate 'in-mould' processes, such as laying a circuit board, can be performed.

It will be seen that the method proposed by the application brings together a first reinforced layer of long or continuous parallel fibre reinforced thermoplastic of a first polymer, a core layer and a second reinforced layer of long or continuous parallel fibre reinforced thermoplastic of a first polymer. Each of the layers may be constituted by a commercial product but the hybrid structure produced by the method has advantageous properties as outlined herein which are not achievable from any of the starting materials.

The core layer may be provided by any suitable material examples of which include random glass reinforced thermoplastic such as 'Azdel' produced by GE Azdel, Southfield MI 48076, USA, or a similar product from Quadrant Composites of Lenzburg, Switzerland.

The first and second reinforced layers may be provided by a continuous unidirectional fibre reinforced material. Examples of such materials are provided under the trade name 'Plytron' from Gurit Suprem, CH-8247 Flurlingen, Switzerland, or similar products from Mitsui, Japan. Similar products can be used from a variety of sources. Alternative embodiments may use continuous fibres with a powder coated product, but it is believe that the properties of the finished hybrid structure are not as good.

Preferably the core layer has at least roughly 70% by volume of the second polymer (i.e. there may be up to roughly 30% of other material in the core layer which would generally be a reinforcing material). Provision of a core layer having generally 70% by volume of the second polymer generally equates to providing a structure in which the volume of the core material is roughly equal to the volume of the material in the reinforced layers.

Provision of the second polymer to greater than 50% of the sum of the skin materials by volume is thought to be advantageous because it generally provides a core layer which is roughly equal in thickness to the combined thickness of the two reinforced layers. This allows stiffness and dimensional stability to be maintained, whilst improving processability and reducing cost.

In some embodiments (and depending upon the polymer used), the method further comprises treating the moulded panel with a flame treatment, corona discharge or a plasma gun. As will be familiar to the man skilled in the art, treating a polymer in this way increases the surface tension which can improve paint adhesion.

As will be understood by the person skilled in the art, 'long-fibre' reinforced thermoplastics are impregnated with fibres—which are commonly glass, carbon, synthetic or natural materials—such that they maintain their shape under varying environmental conditions. The skilled person will appreciate that within the art the term long has a meaning of a fibre having a length of between roughly 1 mm and roughly 10 mm and that a continuous fibre has a length of any thing over roughly 10 mm up to the length of the product in which the fibre is used. Short fibres are recognised as having a length of under roughly 1 mm. In a particularly preferred embodiment, the fibres are continuous and therefore may be anywhere between 10 mm in length and up to roughly the length of the panel being produced.

The first and second polymers may be the same, or substantially the same polymer. This is advantageous as such a panel may be readily melted and recycled—a panel incorporating more than one polymer may have unpredictable qualities and therefore its re-use may be limited or prevented.

The moulding may be performed in a vacuum consolidation mould, a stamp-press mould or any other suitable mould. These provide convenient moulds which are in use in the art.

In preferred embodiments, the tooling surface (i.e. the surface in contact with the panel) is heated. This may save energy when compared to heating the mould as a whole.

Further, in preferred embodiments, heat is applied to at least the tooling surface intended to mould a side of the panel to be painted. This is advantageous as the heating process allows the plastic to melt and form a smooth, readily paintable surface.

The method may further comprise cooling the mould. This may allow the panel to be cooled and therefore processed more quickly than would be possible if the mould was left to cool. The mould may be cooled using a cooling fluid or in some other way. In some embodiments, particularly where only the tooling surface of the mould is heated, only the cooling surface may be cooled. This may reduce the amount of cool fluid required.

The method may comprise providing the core layer such that it comprises approximately 50% of the depth of the panel. This is convenient as it allows the reinforced layers to be separated by a reasonable amount (as a rule, the greater their separation, the greater the stiffness of the panel). However, in alternative embodiments, the core layer may comprise roughly any of the following: 25%, 40%, 60%, 80% or some value in between.

In some embodiments, the method may comprise providing more than two reinforced layers. In what is perhaps a preferred embodiment, there are two reinforced layers either side of the core layer, wherein the outermost layers incorporate fibres in a first direction and the inner reinforced layers incorporated fibres in a second direction, orthogonal to the first and the core is disposed between the inner reinforced layers. This may be advantageous as the fibres act to limit thermal expansion in two directions.

In preferred embodiments, the reinforcing layer(s) to one side of the core layer may be arranged to substantially 'mirror' the reinforcing layer(s) to the other side of the core. This is intended to mean both that the layers are balanced in number either side of the core and also that the orientation of the fibres are mirrored, for example in a 5-layer structure, the outermost layers may comprise longitudinally oriented fibres and the inner reinforced layers may comprise transversely orientated fibres (see FIG. 1 for an example of a 'mirrored' arrangement). This arrangement is advantageous as it prevents distortion. It should be noted that further finish—for example a paint layer or fabric layer—does not upset the balance of the panel.

In further alternative embodiments, the method may comprise providing the reinforced layer(s) with fibres lying in two roughly orthogonal directions. For example layers in the first and second reinforced layers may normally be laid in what is termed a 0° 90° matrix, mirror imaged from the centre/core.

The layer(s) may additionally or alternatively, comprise fibres lying across the diagonal in what is termed in the art a 'Quasi isotropic' arrangement. In such embodiments, the method may comprise weaving together the fibres before incorporating them into a layer. This may restrict the thermal expansion in various directions with just two layers of reinforced material.

Additionally, or in alternative embodiments, the method may comprise providing the reinforced layer(s) with fibres laying at angles to one another other than at 90°. In one particularly advantageous embodiment fibres are oriented at roughly 37° to one another. This, in the case of a polypropylene matrix, has been found to be particularly advantageous since it will gives the resultant plastics material thermal expansion properties roughly equal to those of steel. The thermal properties of the resultant plastics material may be matched to other materials by orienting the fibres at other directions to one another.

The method may comprise providing the core layer with reinforcing fibres. Suitable fibres may be randomly orientated fibres. This may improve the strength of the panel. Alternatively, the core may be provided as a natural, or un-reinforced, material. This may be advantageous as it may improve the malleability of the panel.

The core may be made up of recycled material, for example ground-up plastic parts. In one example, a bumper may be recycled. As will be appreciated by the person skilled in the art, bumper material does not generally include fibre reinforcement, but there is a 'filler', normally a synthetic rubber that improves impact performance and paint adhesion). The bumper may also be painted. The ground bumper may be regarded as a filled grade with paint particles also acting as a filler in the ground material. It has previously been considered that such recycled material cannot be used in manufacturing panel which are required to be strong.

This is because the impurities such as paint flecks cause discontinuities in the structure, which is then prone to fracture about those points. However, under the present arrangement, the strength is provided by the reinforced layers and the recycled material may be used without the need to strip the part of paint or remove other impurities first.

The core layer could also be formed from industrial regrind (e.g. from a fibre manufacturer) or end of use recycling (e.g. packaging).

The method may comprise using the panel in the manufacture of a vehicle. The panel may for example provide the bonnet, roof or boot of a car. Alternatively, it may provide a panel for an aircraft door or body part.

According to a second aspect of the invention there is provided a panel formed of laminate composite material comprising a core of thermoplastic comprising at least 70% of a predetermined polymer by volume and cover layers comprising long and/or continuous fibre reinforced thermoplastic of the predetermined polymer, wherein the long and/or continuous fibres are oriented parallel to the surface of the cover layers and the inner layer is at least partly covered on each surface by a cover layer, wherein the layers have been consolidated in a heated mould.

Preferably, the material is arranged such that when heat is applied to the cover layer, polymer from the core will be drawn towards the surface(s) of the cover layers.

This may be advantageous as it provides a smooth surface which is easy to paint.

Preferably, the stack comprises at least three layers, the two outer layers comprising continuous fibre reinforced thermoplastic of the common polymer and at least one inner layer comprising an unreinforced or random fibre reinforced thermoplastic of the common polymer.

The layers may have been consolidated in a vacuum consolidation mould or by stamping. These are convenient methods of forming a panel which are in use in the art.

According to a third aspect of the present invention there is provided a composite plastic comprising at least one inner layer of thermoplastic of a predetermined polymer and further comprising at least two cover layers of long or continuous fibre reinforced thermoplastic of the predetermined polymer, wherein the long or continuous fibres are oriented substantially parallel to the surface of the cover layers and the inner layer is generally covered on each surface by a cover layer.

Such a composite plastic may be advantageous as the cover layers may enable a sample of the composite to maintain its shape under different environmental conditions and the inner layer may provide increased malleability.

In a particularly preferred embodiment the fibres in the cover layers are continuous.

According to a fourth aspect of the present invention, there is provided a method of painting a fibre reinforced plastic panel comprising applying a first layer of primer paint which is thixotropic, allowing the first layer to form a rigid coating and applying a second layer of paint.

This may be advantageous as composite laminate plastic panels may comprise outer layers reinforced with fibres, which may be glass, carbon, natural or synthetic fibres. Such panels will, when subjected to changes in temperature due, for example, to standing in the sun, be subject to changes in thickness under thermal expansion and contraction. On expansion, a paint layer may be pushed up and may remain in that position following contraction. This can result in 'witness marks', in particular of the fibres, being left in the paint finish over time.

In some embodiments, the plastic may comprise a composite plastic. In such embodiments, the composite may comprise at least three layers, the two outer layers comprising a long and/or continuous fibre reinforced thermoplastic of the common polymer and at least one inner layer comprising an unreinforced or random fibre reinforced thermoplastic of the common polymer.

This method may be particularly advantageous in the case of a panel formed from a stack of at least three layers, the two outer layers comprising a long and/or continuous fibre reinforced thermoplastic of the common polymer and at least one core layer comprising a thermoplastic of the common polymer. Although such a panel may have desirable strength and heat expansion properties, the long fibres may be particularly prone to leaving witness marks. Such a primer layer can help to seal the surface such that changes in thickness may not be perceptible by the naked eye.

The method may further comprise providing the second layer of paint as a coloured layer. This is convenient as it allows a coloured panel to be produced.

The method may further comprise providing a layer of clear gloss coat. This may be advantageous as it provides a high quality finish which is durable an visually pleasing.

As will be appreciated by the man skilled in the art, features described in relation to one of the aspects of invention described above may equally apply to other aspects.

Embodiments of the invention are now described by way of example only and with reference to the accompanying Figures of which:

FIG. 1b shows a 'blank' formed from the five layer composite of FIG. 1a;

Figure 1A:
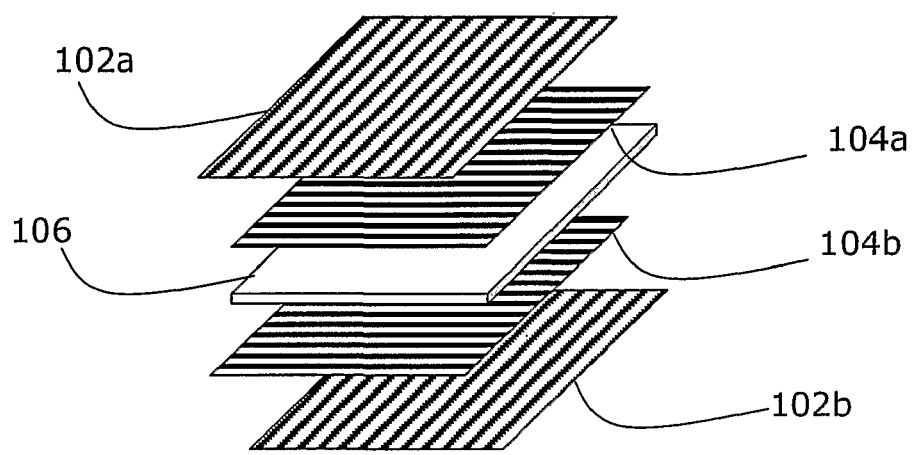
FIG. 1a shows a five layer composite before the layers are bonded.
Figure 1B:
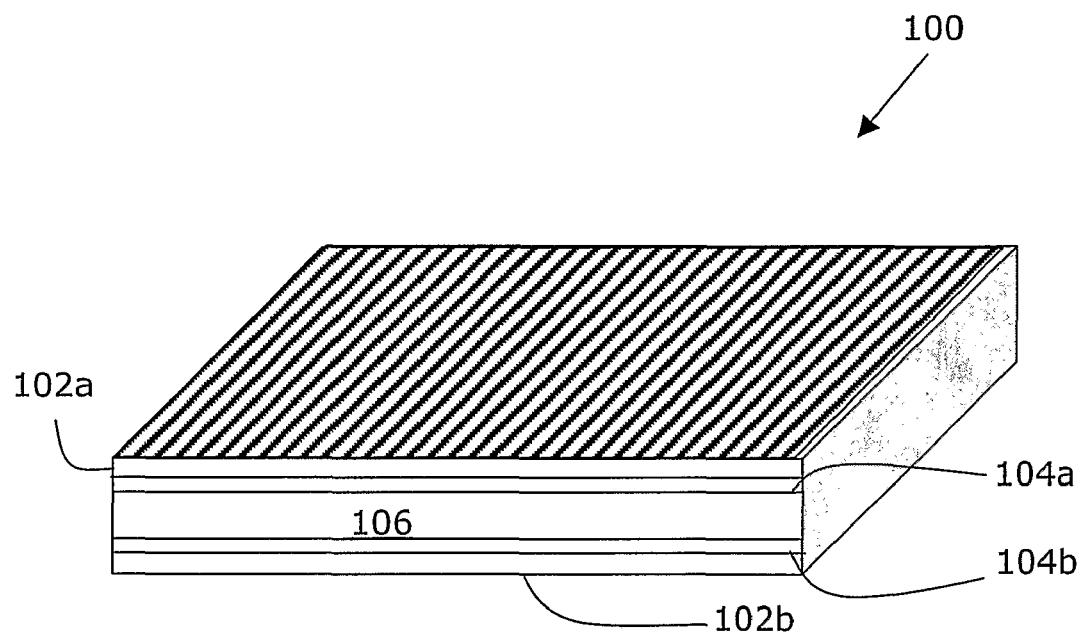

The present example relates to providing a car panel with a high quality painted finish. FIG. 1a shows the layers that make up a laminate blank 100 (a 'blank' is an item to be moulded) of FIG. 1b according to the present invention. The layers comprise two outermost layers 102a, 102b of continuous-fibre unidirectional reinforced polypropylene, an example of what is known in the art as a 'thermoplastic prepreg', wherein the fibres are orientated in a first direction. As will be familiar to a person skilled in the art, a 'long' fibre, in this context, generally means a fibre with a length greater than around 1 cm, distinguishing from 'short' fibres of around 0.4 mm in length, such as are used to reinforce plastics to be injection moulded. In the present example, fibres of at least four to ten centimeters are suitable (i.e. what would be termed continuous fibres) and the fibres run roughly parallel to the surface of the layers 102a, 102b.

Figure 3:
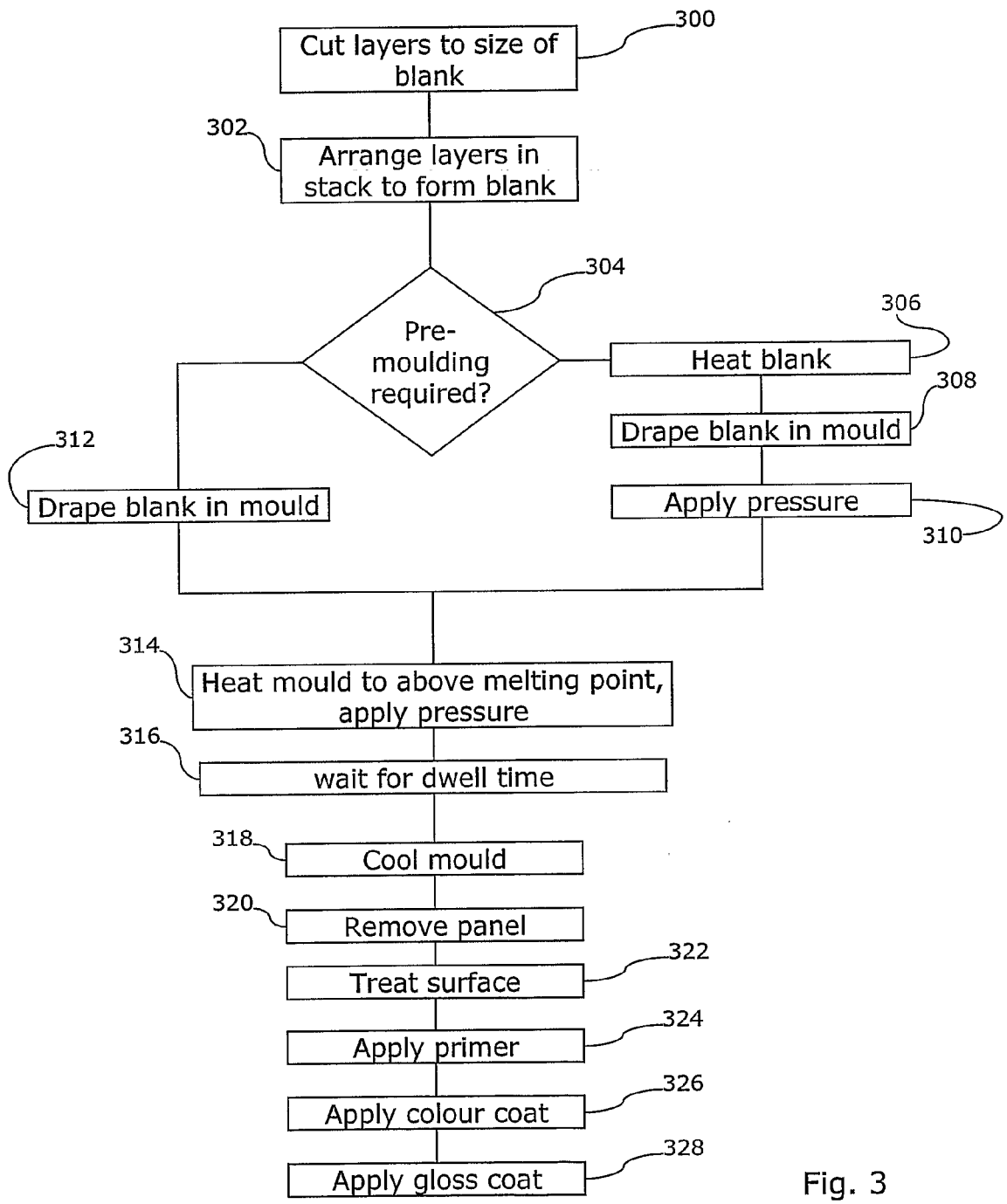
FIG. 3 shows a flow chart of a process according to one embodiment of the present invention.

The layers 102a, 104a, 106, 104b, 102b may generally be provided on rolls and can be pulled out to and cut to the size of the blank 100 in step 300 of the process described in the flowchart of FIG. 3. The layers 102a, 104a, 106, 104b, 102b are then placed in a stack to form the blank 100 in step 302.

Inside each of the outermost fibre reinforced layer 102a, 102b is an inner layer 104a, 104b of continuous-fibre unidirectional reinforced polypropylene, wherein the fibres are orientated in a second direction, roughly orthogonal to the first direction.

Between the inner layers 104a, 104b is a substrate, or core layer 106 comprising 'natural' polypropylene (i.e., the propylene is not reinforced with fibres). This provides a polymer rich core.

The lay-up of the blank 100 is balanced, in that there are the same number of layers either side of the core and that the layers are organised to form a mirror image in the sense that the order of the layer moving out from the core it the same on both sides (e.g. a layer with fibres in the first direction followed by a layer of fibres in the second direction).

The next step is to mould the panel. The skilled person will appreciate that there are various ways of moulding a panel, of which vacuum consolidation and pressing are briefly discussed below, following some discussion of the prior art.

The blank 100 is laid into a mould 200*a*, 200*b*, 200*c* allowing sufficient 'drape' to fill the mould 200*a*, 200*b*, 200*c*. In prior art methods, the blank 100 is heated before being placed in the mould 200*a*, both so that the layers combine and so that the blank 100 is malleable and will take on the shape of the mould 200*a*. However, the material will cool slightly in transfer into the mould 200*a*. The material may not conform entirely to the shape of the mould and a pitted surface may result. This creates a surface which is hard to paint and which may not produce an aesthetically pleasing result.

Figure 2A:
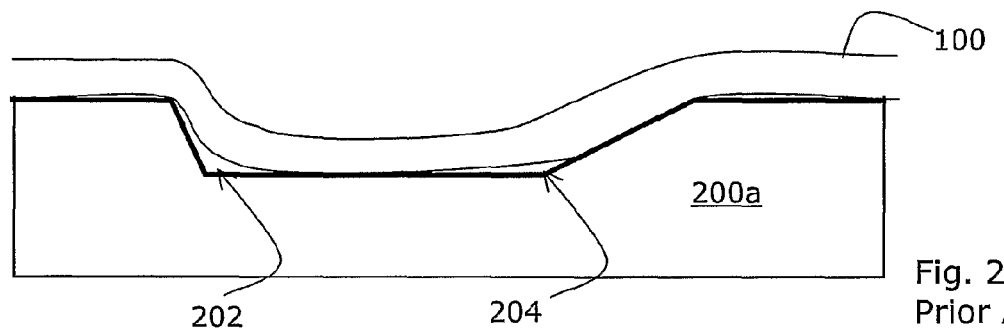
FIG. 2a shows a panel being formed in a mould according to a prior art process.

A further problem is that fibre reinforced materials tend to 'hold off' in concave corners of moulds. An example of this is shown in FIG. 2*a*. The material will not readily take the shape of the mould 200*a* and voids 202, 204 are left between the draped material and the mould 200*a*. This means that sharp corners in a mould 200*a* are not reproduced in the moulded panel. FIG. 2*a* also illustrates that, the sharper the corner (i.e. the smaller the radius of curvature), the more of a void 202, 204 can be seen.

The next stage in the process according to one embodiment of the present invention, step 304, is to consider whether pre-forming is required. Pre-forming is generally required when the shape required from the blank 100 is complex or convoluted. Pre-forming comprises the steps of heating the blank 100 (generally to less than the melting point of the material) (step 306) (Step 306) draping the blank 100 into a mould 200*a* (Step 308), 200*b*, 200*c* and pressing the blank 100 into the extremities of the mould (step 310). Such pressing can be done with a hand-held tool.

Alternatively, where no performing is required, the blank is laid into the mould at substantially the ambient temperature (step 312).

Figure 2B:
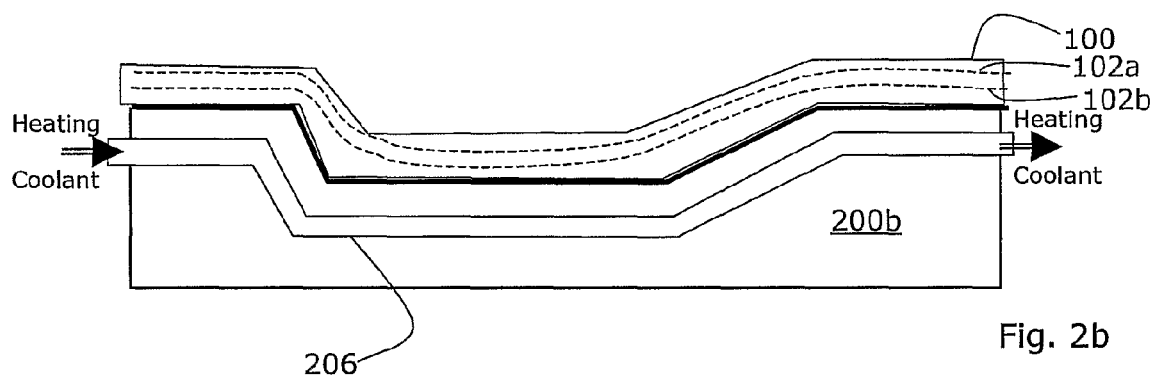
FIG. 2b shows a panel being formed in a vacuum mould according to one embodiment of the present invention.
Figure 2C:
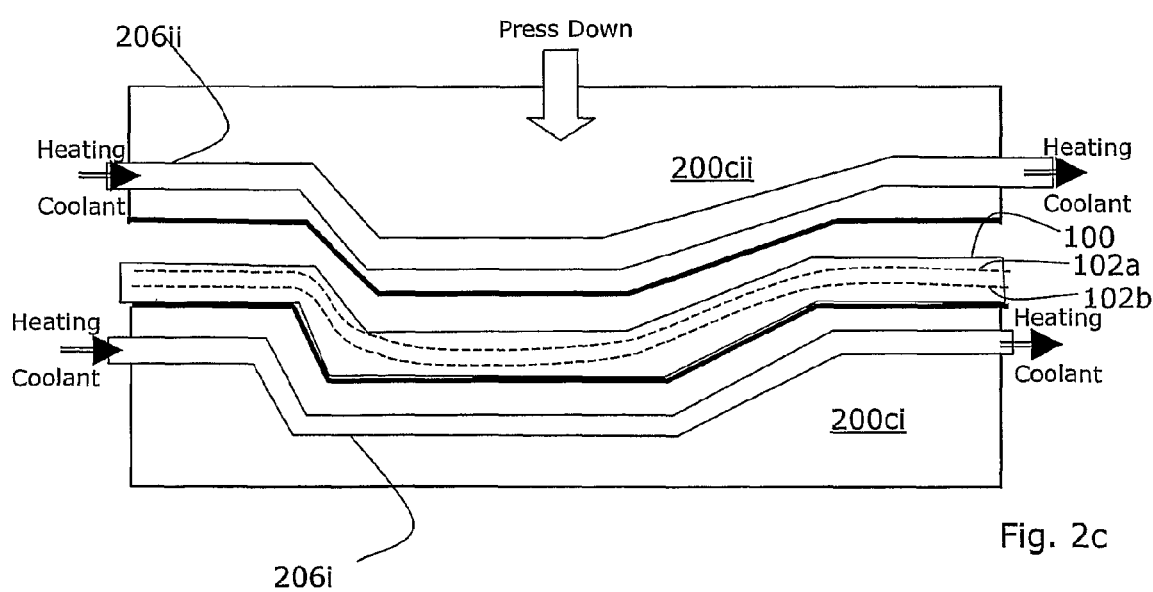
FIG. 2c shows a panel being formed in a press mould according to one embodiment of the present invention.

According to this embodiment of the present example although the layers are laid up to create the blank 100, the layers are not bonded, or 'consolidated', together and, at approximately the ambient temperature, the blank 100 is placed in a heated mould 200*b*, 200*c* as shown in FIGS. 2*b*, 2*c*, in which the outermost layers 102*a* are shown but the remaining layers are not shown for the sake of clarity. A suitable mould 200*b*, 200*c* is manufactured by Roctool, of BP341 Savoie Technolac, 73377 Le Bourget You Lac, France.

The case of vacuum consolidation is considered first. The heated vacuum mould 200*b* of FIG. 2*b* comprises a channel 206 for the introduction of heating or cooling fluids. In alternative embodiments, a mould may be heated by electromagnetic inductive process.

Where vacuum consolidation is used, the heated mould 200*b* has only one surface to which heat is applied. As will be familiar to the person skilled in the art, a panel is formed when pressed into the mould 200*b* by a vacuum applied to a vacuum bag.

In vacuum consolidation, once the blank 100 has been draped into the mould 100*b*, the vacuum bag is sealed, a vacuum is applied and the surface of the mould 200*b* is heated in step 314. The material softens and melts to the face of the mould 200*b*. The mould 200*b* is heated to above the melting point of the material 100. Under the present example, as the melting point of polypropylene is 170° C., the mould 200*b* is heated to 180° C., although in other examples, this may be increase by 30° C. to speed the melting process.

Once the composite has reached 180° C. through to the core, the layers 102*a*, 104*a*, 106, 104*b*, 102*a* become fully consolidated. Under the present example, the tool is heated for around ten minutes to reach the temperature required. The composite is then allowed a few minutes (typically five minutes) 'dwell' time within the mould 200*b* temperature (step 316), where the mould 200*b* is maintained at 180° C., before cooling for around ten minutes (Step 318) before being removed in step 320), giving an overall cycle time of around thirty minutes for the complete cycle including loading and removal.

A faster alternative to vacuum consolidation is press moulding, but as will be appreciated by the skilled person, the tooling-up costs are high as it requires the investment in 'matched' tooling. An example of a press mould 200*c* is shown in FIG. 2*c*.

The press mould 200*c* comprises a female part 200*ci* and a male part 200*cii*, which are brought together to press a part. In the embodiment here described, both the female 200*ci* and the male 200*cii* parts incorporate cooling channels 206*i*, 206*ii* for the introduction of heating or cooling fluids near the surfaces in contact with the part to me machined.

In press moulding, once the blank 100 has been loaded into the mould 200*c*, which is sometimes referred to as a 'tool' in this context, and the mould 200*c* is heated and closed in step 314. A slip frame controls the way that the continuous fibres are allowed to 'slip' into the profile of the mould 200*b*. As will be understood by those skilled in the art, a slip frame comprises a substantially rectangular frame which holds the edges of a rectangle of material to be pressed, clamping with a predetermined tension provided by springs. The tension is set so that the material is allowed to 'slip' though the frame and into the mould 200*c* with a predetermined tension. A suitable slip frame can be supplied by Elkington Brothers of Birmingham, UK. Once the blank has been laid into the mould 200*c*, and as the mould 200*c* closes, the heating on the mould 200*c* brings the material up above its melting point (step 306) as described above in relation to vacuum consolidation). The blank 100 has a 'dwell' time before the heat on the mould 200*c* removed (step 316) and the mould 200*c* cooled. The part is then cooled (step 318) to a temperature at which it can safely be removed from the mould 200*c* (step 320). The overall cycle time can be under two minutes.

In both pressing and vacuum consolidation, the presence of heat at the surface means that the polymer tends to melt and run into any voids between the mould 200*b*, 200*c* and the fibres of the outermost layers 102*a*, 102*b*.

Both processes operate at a 'low' pressure of around one bar to ensure that there is minimal fibre movement in the outermost 102*a,b* and inner layers 104*a, b*. In alternative embodiments, pressures of between roughly one to ten bars may be appropriate.

The panel is taken from the mould 200*b* and trimmed as necessary. In the present example of polypropylene, if it is to be painted, some pre-treatment is required. The surface of panel is prepared with flame treatment or plasma gun (step 322) and tested to ensure a surface tension in excess of 40 Dynes/cm, as is required for paint adhesion for a high quality finish. Other polymers may not require this treatment or may require another treatment.

Whilst it will be understood that the thermal expansion of the panel has been reduced by the inclusion of fibre reinforcement, there is still thermal expansion in the thickness of the panel described caused by changed in the temperature of the environment, which remains unrestricted by fibres. Thermal expansion does also occur but to a much lesser degree compared to the same polymer but with not reinforcing. Unless preventative action is taken, this movement is however sufficient to allow a so-called 'witness' of the fibre reinforcement to show in the surface aspect. A 'witness' is seen when the panel has expanded and the paint moved with it, but the paint returns to it original position on cooling. This effect can leave a 'witness' of the fibres in the paint finish. It will be appreciate by the man skilled in the art that a paint finish for a car will be subjected to standard climatic cycle tests before it is used on a car and such test will demonstrate this effect.

However, under the present example, a primer finish is also applied (step 324) to the panel such that a layer of less flexible skin that does not move with the panel forms. The primer according to one embodiment of the present invention incorporates a hardening lacquer.

The resulting primed panel is left to dry before being painted with a coloured paint (step 326). Once this has dried, a topcoat comprising a clear gloss overcoat is applied (step 328).

It will be appreciated the example described herein has particular application where large horizontal panels such as bonnets, roofs and boots as these are subjected to a high thermal load from the sun.

In alternative embodiments, which are to be considered within the scope of the present invention, there may be only three layers—the outer layers comprising woven fibre, bi-direction fibre or 'quasi-isotropic' (fibres which run lengthwise, across and on the diagonal) fibre reinforcement, with the core layer as described above. Alternatively, the core layer may not comprise natural polypropylene but may instead comprise 'random fibre' reinforced polypropylene or may be a recycled material, (for example, a ground-up car part such as a bumper) with impurities such as paint flecks. Indeed, the layers of the composite may comprise a thermoplastic other than polypropylene, although the skilled person will appreciate that the choice of polymer will have an affect on the process as a whole—treatment temperatures will be different, some of the method steps (in particular, treating the panel prior to painting) will not be necessary.

Further, pre-treating a moulded part before painting may not be essential for some polymers.

The method may comprise additional 'in-mould' processes, such as coating with a decorative foil, a facing fabric or an electric circuit.

The fact that the panel has a feature comprising a discontinuation in curvature of the surface may be an optional feature to the invention.

The invention claimed is:

1. A method of producing a panel having at least one feature comprising a discontinuation in curvature of surface in the surface, the method comprising the steps of:
   providing a first reinforced layer of long and/or continuous parallel fibre reinforced thermoplastic of a first polymer;
   providing a core layer of thermoplastic of a second polymer which is compatible with the first polymer;
   providing a second reinforced layer of long or continuous parallel fibre reinforced thermoplastic of the first polymer;
   stacking the layers such that the reinforced layers are separated by the core layer;
   providing at least two additional reinforced layers so that two reinforced layers are on either side of the core layer to provide outermost layers and inner layers, wherein the outermost layers incorporate fibres in a first direction and the inner layers incorporated fibres in a second direction, orthogonal to the first direction, and the core is disposed between the inner layers; and
   introducing the stack into a panel mould and heating the mould to at least the melting point of at least one of the first and the second polymer to consolidate the layers and form the panel with a discontinuation in curvature.

2. The method according to claim 1 in which the core material has roughly 70% by volume of the second polymer.

3. The method of producing a panel according to claim 1 which further comprises treating the moulded panel with a flame treatment, corona discharge or a plasma gun.

4. The method of producing a panel according to claim 1 in which the first and second polymers are the same, or substantially the same polymer.

5. The method of producing a panel according to claim 1 in which the moulding is performed in a vacuum consolidation mould or a stamp-press mould.

6. The method of producing a panel according to claim 1 in which at least a portion of the mould is heated.

7. The method of producing a panel according to claim 6 in which at least a tooling surface intended to mould a side of the panel to be painted is heated.

8. The method of producing a panel according to claim 1 which further comprises cooling at least a portion of the mould.

9. The method of producing a panel according to claim 8 in which only the tooling surface is cooled.

10. The method of producing a panel according to claim 1 which comprises providing the core layer such that it comprises approximately 50% of the depth of the panel.

11. The method of producing a panel according to claim 1 in which the reinforcing layer(s) to one side of the core layer are arranged to substantially mirror the reinforcing layer(s) to the other side of the core.

12. The method of producing a panel according to claim 1 which comprises providing the reinforced layer(s) with fibres lying in two orthogonal directions and/or the layer(s) additionally comprise fibres lying across the diagonal in a Quasi isotropic arrangement.

13. The method of producing a panel according to claim 12 which comprises weaving together the fibres before incorporating them into a layer.

14. The method of producing a panel according to claim 1 which comprises providing the core layer with reinforcing fibres.

15. The method of producing a panel according to claim 1 in which the core is made up of recycled material, industrial regrind or end of use recycling.

16. The method of producing a panel according to claim 1 further comprising contouring the panel in a shape of a vehicle panel.

17. The method according to claim 1 in which the core material has roughly an equal volume to the combined volume of the two reinforced layers.

18. A method of producing a panel having at least one feature comprising a discontinuation in curvature of surface in the surface, the method comprising the steps of:
   providing a first reinforced layer of long and/or continuous parallel fibre reinforced thermoplastic of a first polymer;
   providing a core layer of thermoplastic of a second polymer which is compatible with the first polymer;
   providing a second reinforced layer of long or continuous parallel fibre reinforced thermoplastic of the first polymer;
   stacking the layers such that the reinforced layers are separated by the core layer;
   providing the reinforced layer(s) with fibres at least one of lying in two orthogonal directions and the reinforced layer(s) comprise fibres lying across the diagonal in a Quasi isotropic arrangement; and introducing the stack into a panel mould and heating the mould to at least the melting point of at least one of the first and the second polymer to consolidate the layers and form the panel with a discontinuation in curvature.

19. The method of producing a panel according to claim 18 which comprises weaving together the fibres before incorporating them into a layer.

* * * * *